United States Patent
Hsu et al.

(10) Patent No.: US 9,639,467 B2
(45) Date of Patent: May 2, 2017

(54) ENVIRONMENT-AWARE CACHE FLUSHING MECHANISM

(71) Applicant: MediaTek Inc., Hsinchu (TW)

(72) Inventors: Chia-Hao Hsu, Lukang (TW); Fan-Lei Liao, Taichung (TW); Shun-Chih Yu, Wujie (TW)

(73) Assignee: MediaTek, Inc., Hscinhu (TW)

( * ) Notice: Subject to any disclaimer, the term of this patent is extended or adjusted under 35 U.S.C. 154(b) by 0 days.

(21) Appl. No.: 14/935,477

(22) Filed: Nov. 9, 2015

(65) Prior Publication Data

US 2017/0010965 A1    Jan. 12, 2017

Related U.S. Application Data (60) Provisional application No. 62/188,887, filed on Jul. 6, 2015.

(51) Int. Cl.
| | |
|---|---|
| *G06F 12/00* | (2006.01) |
| *G06F 12/0804* | (2016.01) |
| *G06F 12/0806* | (2016.01) |
| *G06F 12/0808* | (2016.01) |
| *G06F 12/0802* | (2016.01) |

(52) U.S. Cl.
CPC ...... *G06F 12/0804* (2013.01); *G06F 12/0802* (2013.01); *G06F 12/0806* (2013.01); *G06F 12/0808* (2013.01); *G06F 2212/62* (2013.01)

(58) Field of Classification Search
CPC ............. G06F 12/0802; G06F 12/0804; G06F 12/0806; G06F 12/0808; G06F 2212/62
See application file for complete search history.

(56) References Cited

U.S. PATENT DOCUMENTS

2013/0086417 A1\* 4/2013 Sivaramakrishnan ... G06F 11/1666
714/6.13

\* cited by examiner

*Primary Examiner* — Shawn X Gu
(74) *Attorney, Agent, or Firm* — The Law Office of Tong Lee (57) ABSTRACT

A computing system performs an environment-aware cache flushing method. When a processor in the system receives a signal to flush at least a portion of the caches to the system memory, the processor determines a flushing mechanism among multiple candidate flushing mechanisms. The processor also determines one or more of the active processors in the system for performing the flushing mechanism. The determinations are based on the extent of flushing indicated in the signal and a runtime environment that includes the number of active processors. The system then flushes the caches to the system memory according to the flushing mechanism.

20 Claims, 6 Drawing Sheets

ENVIRONMENT-AWARE CACHE FLUSHING MECHANISM

CROSS-REFERENCE TO RELATED APPLICATIONS

This application claims the benefit of U.S. Provisional Application No. 62/188,887 filed on Jul. 6, 2015.

TECHNICAL FIELD

Embodiments of the invention relate to memory management in a computing system; and more specifically, to a cache flushing mechanism in a multi-processor computing system.

BACKGROUND

In a multi-processor computing system, each processor has its own cache to store a copy of data that is also stored in the system memory (i.e., the main memory). A cache is a smaller, faster memory than the system memory, and is generally located on the same chip as the processors. Caches enhance system performance by reducing off-chip memory accesses. Most processors have different independent caches for instruction and data. The data cache is usually organized as a hierarchy of multiple levels, with smaller and faster caches backed up by larger and slower caches. In general, multi-level caches are accessed by checking the fastest, level-1 (L1) cache first; if there is a miss in L1, then the next fastest level-2 (L2) cache is checked, and so on, before the external system memory is checked.

One of the commonly used cache writing policies is called the "write-back" policy. With the write-back policy, a processor writes a data item only to its local cache. The write to the system memory is postponed until the cache line containing the data item is about to be replaced by another cache line. Before the write-back operation, the cache content may be newer and inconsistent with the system memory content which holds the old data. To ensure that the system memory stores the most up-to-date data, the cache content may be flushed (i.e., written back) into the system. Cache flushing may occur when a block of data is requested by a direct-memory access (DMA) request, such as when a multimedia application that runs on a video processor needs to read the latest data from the system memory.

However, the applications needing the memory data may be blocked until the cache flushing operation completes. Thus, the latency of cache flushing is critical to the user experience. Therefore, there is a need for improving the performance of cache flushing.

SUMMARY

In one embodiment, a method is provided for flushing a plurality of caches to a system memory in a computing system. The caches are coupled to a number of active processors including a first processor in the computing system. The method comprises: receiving, by the first processor, a signal to flush at least a portion of the caches to the system memory; based on an extent of flushing indicated in the signal and a runtime environment that includes the number of active processors, determining a flushing mechanism among a plurality of candidate flushing mechanisms and one or more of the active processors for performing the flushing mechanism; and flushing the caches to the system memory according to the flushing mechanism.

In one embodiment, a system that performs cache flushing is provided. The system comprises a plurality of processors that include a number of active processors; a plurality of caches coupled to the active processors; and a system memory coupled to the plurality of caches. Each processor of the active processors is operative to: receive a signal to flush at least a portion of the caches to the system memory; based on an extent of flushing indicated in the signal and a runtime environment that includes the number of active processors, determine a flushing mechanism among a plurality of candidate flushing mechanisms and one or more of the active processors for performing the flushing mechanism; and direct the one or more of the active processors to flush the caches to the system memory according to the flushing mechanism

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

It should be noted that the term "multi-processor computing system" as used herein is equivalent to a "multi-core processor system." In one embodiment, each processor described herein is equivalent to a central processing unit (CPU), which may contain one or more cores. In an alternative embodiment, each processor described herein may be equivalent to a core. A cluster may be implemented as a group of one or more processors.

Embodiments of the invention provide a method and system for efficiently flushing data caches into a system memory (e.g., the main memory such as dynamic random access memory (DRAM)). In one embodiment, a cache controller is provided in a multi-processor computing system. In response to a cache flushing request, the cache controller selects a cache flushing mechanism among multiple candidate flushing mechanisms based on the extent of flushing indicated in the request and the runtime environment of the computing system. The cache controller may also select the number of active processors, or specific one or more of the active processors, to perform the cache flushing procedure. The request may indicate a range of addresses to be flushed from the caches, or indicate that all of the caches to be completely flushed. One example of the runtime environment is the number of active processors in the computing system that are available for performing cache flushing.

For example, one of the candidate flushing mechanisms is the complete flushing, also referred to as set/way flushing, which requires all of the processors to completely flush their caches. The flushing is performed layer-by-layer: the smaller and faster caches (e.g., L1 caches) are flushed first, followed by the larger and slower caches (e.g., L2 caches). The flushing completes after all levels of caches are flushed. Another candidate flushing mechanism is called address-range-specific flushing, also referred to as flushing by address, in which a single processor is responsible for flushing a specific range of virtual addresses from the caches. Yet another candidate flushing mechanism is called address-range-specific parallel flushing, also referred to as parallel flushing, in which multiple processors are assigned to perform cache flushing in parallel to reduce latency. Each processor flushes a partial range of virtual addresses; e.g., if a range of 4 megabytes of virtual addresses is to be flushed by four processors, each processor will be assigned to flush ¼ of the range.

Figure 1:
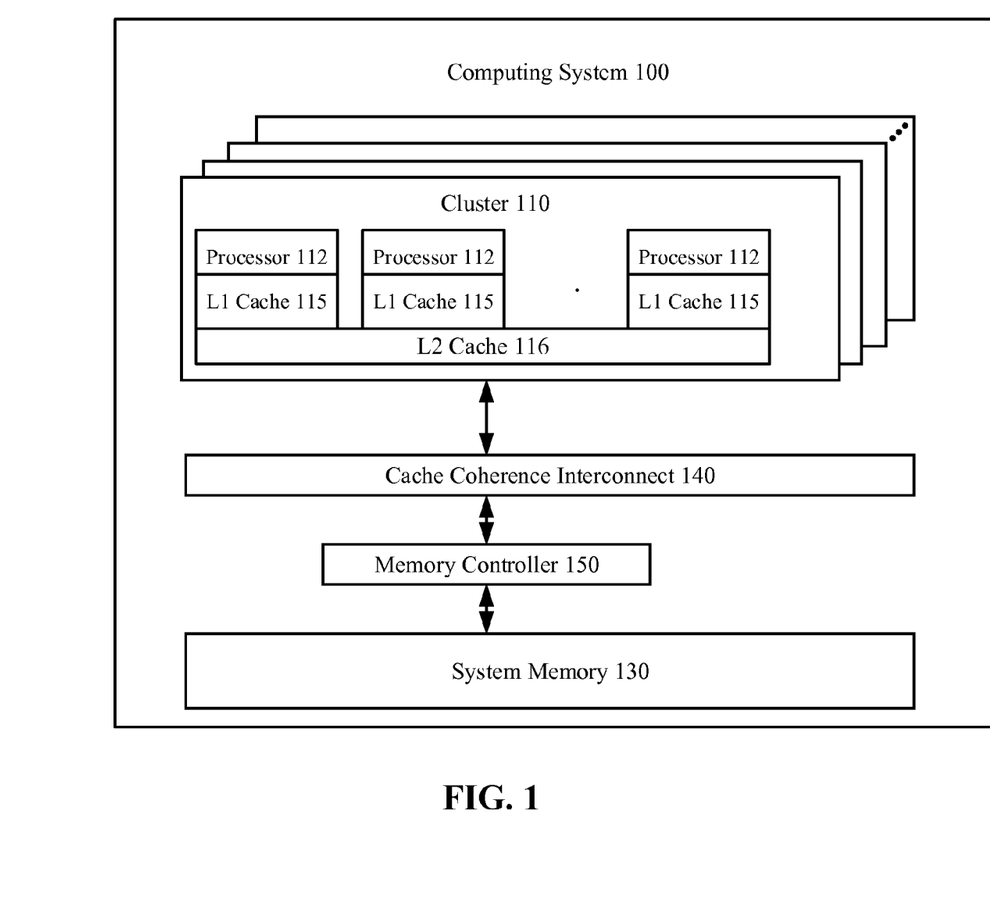
FIG. 1 illustrates a block diagram of a multi-processor computing system according to one embodiment.

FIG. 1 illustrates an example architecture of a multi-processor computing system 100 according to one embodiment. The computing system 100 includes one or more clusters 110, and each cluster 110 further includes one or more processors 112. Each cluster 110 has access to a system memory 130 (e.g., DRAM or other volatile or non-volatile random-access memory) via a cache coherence interconnect 140 and a memory controller 150. It is understood that the computing system 100 may include any number of clusters 110 with any number of processors 112.

In one embodiment, the computing system 100 may be part of a mobile computing and/or communication device (e.g., a smartphone, a tablet, laptop, etc.). In one embodiment, the computing system 100 may be part of a cloud computing system.

FIG. 1 also shows that each processor 112 has its own level-1 (L1) cache 115, and each cluster 110 includes a level-2 (L2) cache 116 shared by the processors 112 in the same cluster. Some or all of the caches 115 and 116 may be N-set/way-associative caches; that is, each system memory location can be mapped to N locations in a cache, where N is a positive integer. The L1 caches 115 and the L2 caches 116 are part of the multi-level cache hierarchy used by the computing system 100. Although two levels of caches are shown, in some embodiments the computing system 100 may have more than two levels of cache hierarchy. For example, each of the L1 cache 115 and the L2 cache 116 may further include multiple cache levels.

Figure 2:
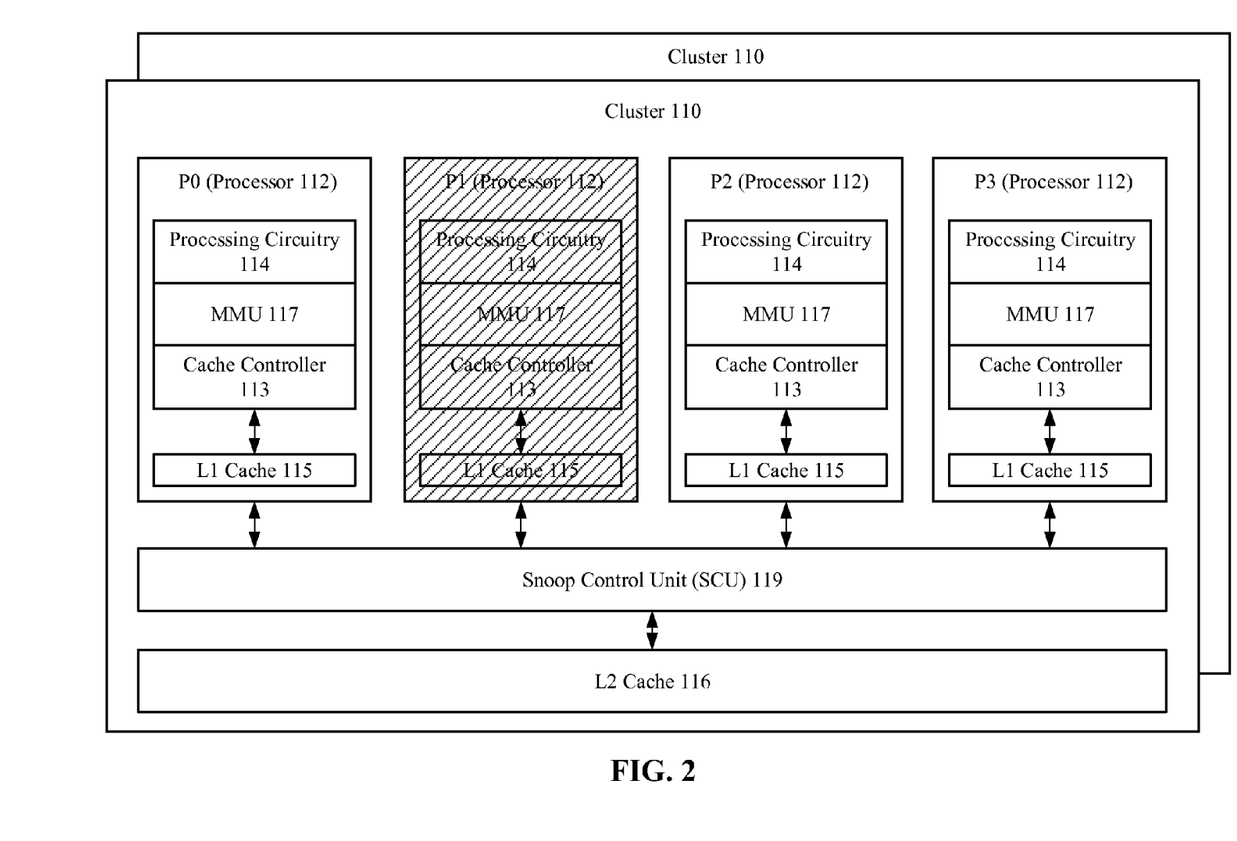
FIG. 2 illustrates a block diagram of a cluster in the multi-processor computing system of FIG. 1 according to one embodiment.

FIG. 2 illustrates an example of the cluster 110 according to one embodiment. In this example, the cluster 110 includes four processors 112 (e.g., P0, P1, P2 and P3), of which P1 is de-activated (e.g., in a power-off or low-power state), and P0, P2 and P3 are active. Each processor 112 includes processing circuitry 114 for performing general-purpose and/or special-purpose computing tasks. Each processor 112 also includes a memory management unit (MMU) 117, which is responsible for translating virtual addresses to physical addresses. Each processor 112 further includes a cache controller 113, which controls the operations of its L1 cache 115, including cache flushing. It is understood that the cluster 110 may include any number of processors, one or more of which may be de-activated.

In one embodiment, the L1 caches 115 and the L2 cache 116 of each cluster 110 use physical addresses as indexes to determine whether a requested data item is present in their internal storage and to access that data item if there is a hit. However, applications that run on the processors 112 typically use virtual addresses to reference data locations. Thus, a request that specifies an address range for cache flushing typically indicates a range of virtual addresses.

In one embodiment, the MMU 117 may include or otherwise use one or more translation look-aside buffers (TLB) to store a mapping between virtual addresses and their corresponding physical addresses. The TLB stores a few entries of a page table containing those address translations that are most likely to be referenced (e.g., most-recently used translations or translations that are stored based on a replacement policy). In one embodiment, each of the caches 115 and 116 may be associated with a TLB that stores the address translations that are most likely to be used by that cache. If an address translation cannot be found in the TLBs, a miss address signal may be sent to the memory controller 150 (FIG. 1) through the cache coherence interconnect 140 (FIG. 1), which retrieves the page table data containing the requested address translation either from the system memory 130 or elsewhere in the computing system 100.

In one embodiment, the cluster 110 also includes a snoop control unit (SCU) 119 that provides the contents and states of its caches 115 and 116 to any processors 112 in the same cluster 110 as the SCU 119 ("host cluster") or in different clusters 110. The SCU 119 also enables the processors 112 in its host cluster to find out which processor(s) in which other cluster(s) has a data copy in its cache(s). The SCU 119 in one cluster 110 may communicate directly with the SCU 119 in another cluster 110 to efficiently exchange the contents and states of their respective cached data. In one embodiment, the state of a cache line may indicate whether the cache line has been modified, has one or more valid copies outside the system memory, has been invalidated, and the like. A cache line refers to a fixed-size data block in a cache, which is a basic unit for data transfer between the system memory 130 and the caches.

In one embodiment, the SCU 119 keeps track of which cache lines are present in which cache. More specifically, for each cache monitored by the SCU 119, the SCU 119 stores the physical tags (each of which is a portion of a physical address) for all of the cache lines present in that cache. In the example of FIG. 2, the SCU 119 may store the physical tags of all cache lines of the L1 caches 115 of the four processors (P0, P1, P2 and P3) in its host cluster, and the physical tags of all cache lines in the L2 cache 116 in its host cluster. These physical tags are also referred to as the SCU tags. Thus, given a physical address of a data copy, the SCU 119 can inform any processor 112 in the system 100 regarding whether its caches 115 and 116 hold the data copy.

According to embodiments of the invention, a processor may select a cache flushing mechanism most suitable for the current runtime environment. For example, when P0 (or any processor 112 in any cluster 110) receives a request for cache flushing, its processing circuitry 114 may select a cache flushing mechanism among candidate cache flushing mechanisms that is most efficient for the current runtime environment.

In one embodiment, the L1 cache 115 in a de-activated processor 112 (e.g., P1) does not participate in cache flushing, as the processor 112 has written back all its cache content to the system memory 130 before the de-activation.

It is understood that in alternative embodiments some of the hardware components in FIG. 2 may reside in different locations from what is shown. For example, in some embodiments the SCUs 119 may be distributed across the processors 112 of each cluster 110, or may be centrally located outside the clusters 110. In some embodiments, the MMUs 117 and/or the cache controllers 113 may be located outside the processors 112 and within a cluster 110. In these various embodiments, the SCUs 119, the MMUs 117 and the cache controller 113 perform the operations as will be described below in connection with FIGS. 3-7, regardless their physical locations.

Figure 3:
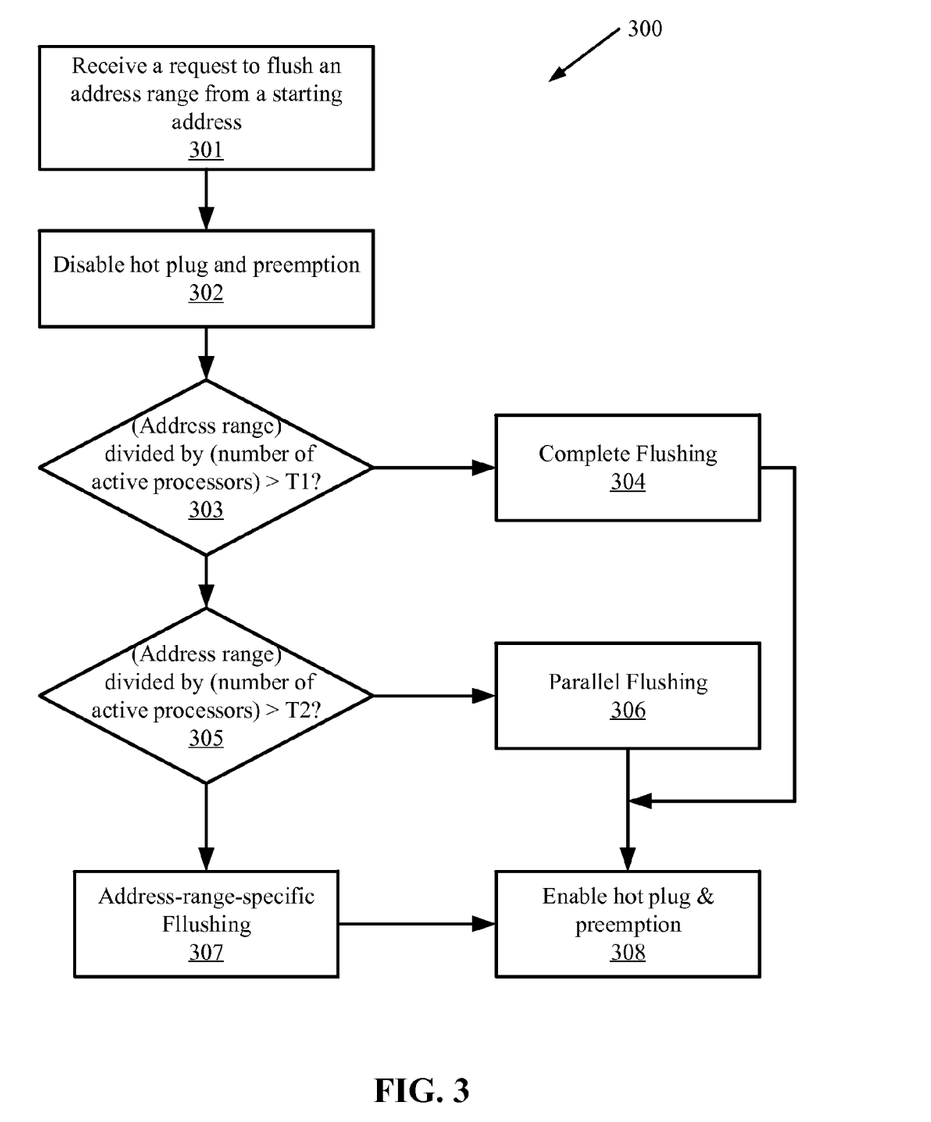
FIG. 3 is a flow diagram illustrating a method for selecting a cache flushing mechanism according to one embodiment.

FIG. 3 is a flow diagram illustrating a method 300 for selecting a cache flushing mechanism according to one embodiment. At step 301, a processor (e.g., P0) receives a request to flush an address range from a starting address. As a precaution to prevent interruption to the cache flushing process, at step 302, CPU hot-plug (i.e., the mechanism for enabling or disabling a processor during operating system runtime without rebooting the system) and preemption are disabled. At step 303, P0 determines whether the address range divided by the number of active processors is greater than a first threshold T1. In one embodiment, the number of active processors includes all of the active processors in the system 100. In one embodiment, the number of active processors may exclude P0. In one embodiment, the number of active processors may include only those active processors that are currently available or suitable for cache flushing; e.g., active processors that are not overloaded (i.e., the workload of an active processor does not exceed an upper threshold). If the quotient (i.e., the result of the division) is greater than T1, than P0 informs all of the active processors to perform complete (i.e., set/way) cache flushing; that is, to completely flush all caches belonging to the active processors. At step 304, all of the active processors perform cache flushing by set/way, and then proceed to step 308.

If the quotient is not greater than T1, but is greater than T2 (where T2<T1) at step 305, then P0 informs the other active processors to perform parallel flushing. In one embodiment, P0 may select which of the active processors to participate in the parallel flushing; e.g., only those active processors whose workload does not exceed an upper threshold. At step 306, P0 and the other active processors perform parallel flushing and then proceed to step 308. Further details on the parallel flushing will be provided in connection with FIG. 5.

If at step 305 the quotient is not greater than T2, then P0 performs address-range-specific flushing at step 307 and proceeds to step 308. Further details on the address-range-specific flushing will be provided in connection with FIG. 4. At step 308, the CPU hot-plug mechanism and preemption are enabled when the cache flushing process terminates.

In one embodiment, both T1 and T2 are configurable numbers, which can be adjusted according to cache sizes, processor capacity and/or runtime conditions. In some embodiments, one or more of the factors that include the requested flush address range, the number of active processors in the system, and the quotient of the address range divided by the number of active processors may be considered for deciding a flushing mechanism.

In some cases, a processor (e.g., P0) may receive a request without an indication of an address range, which means that all caches accessible by the currently active processors should be flushed. The request may be directed to the caches in one cluster or multiple clusters. The request is forwarded by the receiver of the request (e.g., P0) to the active processors in the affected clusters. Then these active processors in the affected clusters will flush their respective caches.

Figure 4:
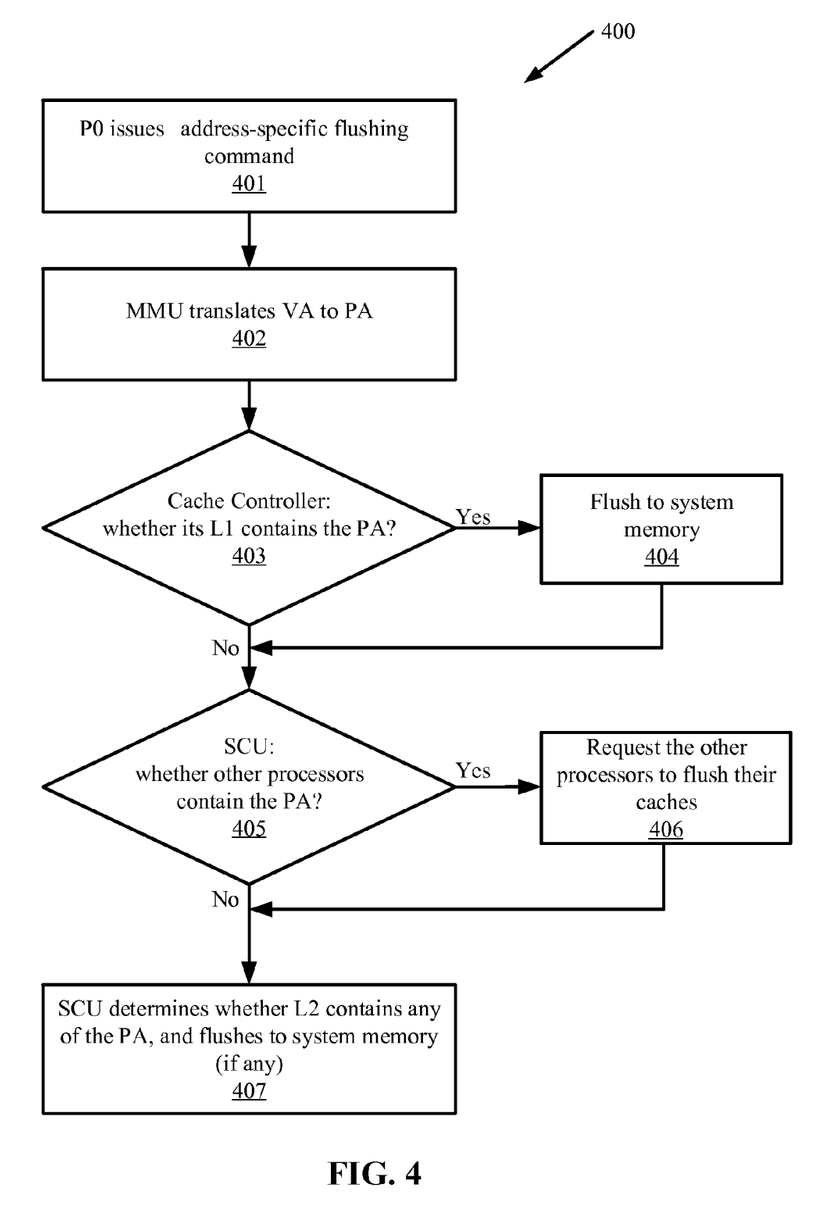
FIG. 4 is a flow diagram illustrating a method for address-range-specific flushing according to one embodiment.

FIG. 4 is a flow diagram illustrating a method 400 of address-range-specific flushing according to one embodiment. Although processor P0 is used in this example, it is understood that the method 400 may be performed by any active processor in the system 100 (FIG. 1) that receives a cache flushing request and selects the address-range-specific flushing mechanism for cache flushing.

Referring also to FIG. 2 and FIG. 3, if the address-range-specific flushing is selected at step 307 of FIG. 3, then P0 issues an address-range-specific flushing command at step 401. The MMU 117 of P0 translates the range of virtual addresses (abbreviated as "VA") indicated in the command to physical addresses (abbreviated as "PA") at step 402. At step 403 the cache controller 113 of P0 determines whether its L1 cache 115 contains the physical addresses or at least a portion thereof. If the L1 cache 115 contains any portion of the physical addresses, then P0 flushes the content of those physical addresses into the system memory 130 at step 404. Moreover, the SCU 119 of the host cluster (which is in the same cluster as P0) identifies which of the other processors 112 in the same host cluster have cached at least a portion of the physical addresses by checking the SCU tags at step 405, and requests these other processors to flush the portion of the physical addresses from their L1 caches 115 at step 406. The SCU tags may indicate that a requested physical address is owned by a processor other than P0 in the host cluster, or is shared by multiple processors in the host cluster. In addition to the host cluster, in one embodiment, the SCU 119 of the host cluster may request the SCU(s) of the other cluster(s) to check their SCU tags and to have the other clusters' processors flush a portion of their caches (including L1 and L2 caches) if they own any portion of the requested physical addresses. At step 407, the SCU 119 further determines whether its L2 cache 116 (in the host cluster) contains any portion of the physical addresses. If it does, the portion of the physical addresses in the L2 cache 116 is flushed to the system memory 130.

Figure 5:
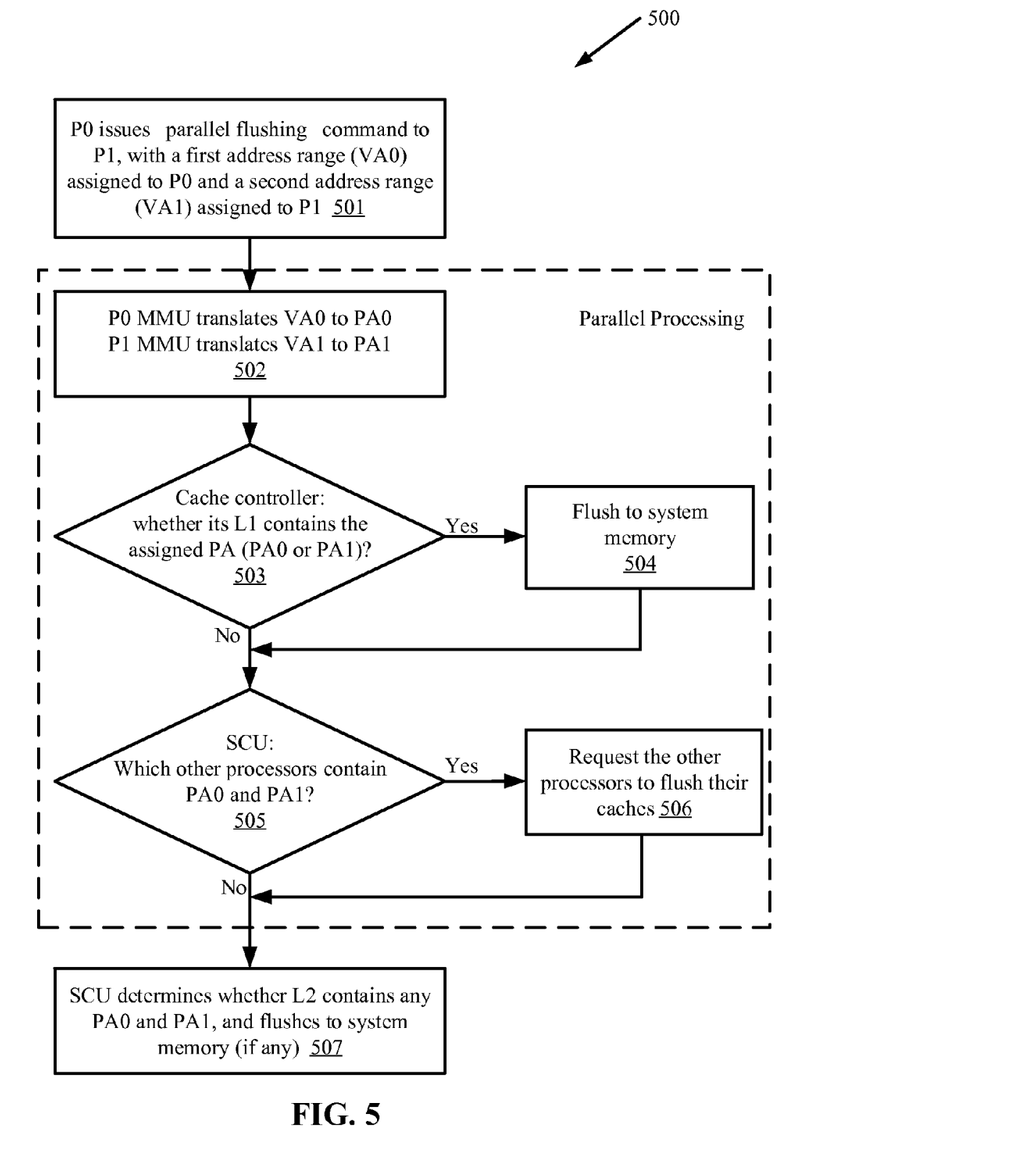
FIG. 5 is a flow diagram illustrating a method for address-range-specific parallel flushing according to one embodiment.

FIG. 5 is a flow diagram illustrating a method 500 of parallel flushing according to one embodiment. Although processor P0 is used in this example, it is understood that the method 500 may be performed by any active processor in the system 100 (FIG. 1) that receives a cache flushing request and select the parallel flushing mechanism for cache flushing. The parallel processing portion of the method 500 include at least the steps included in the dotted box of FIG. 5.

Referring also to FIG. 2 and FIG. 3, if the parallel flushing is selected at step 306 of FIG. 3, then at step 501, P0 issues a parallel flushing command to direct the active processors participating in the parallel flushing to start cache flushing. In one embodiment, P0 may be one of the participating processors. In an alternative embodiment, P0 itself may not participate in the parallel flushing. In one embodiment, P0 may select which of the active processors to participate in the parallel flushing; e.g., only those active processors whose workload does not exceed an upper threshold. The selected processors may be in the same cluster or across multiple clusters. In this example, P0 and P1 are the processors participating in the parallel flushing. The command issued by P0 includes a distinct portion of the requested address range assigned to each processor participating in the parallel flushing. In this example, a first address range (VA0) is assigned to P0 and a second address range (VA1) is assigned to P1.

In one embodiment, the MMU 117 of each participating processor translates the designated range of virtual addresses to physical addresses at step 502. In this example, the translated physical addresses for P0 is PA0, and for P1 is PA1. At step 503 the cache controller 113 of each participating processor determines whether its L1 cache 115 contains the assigned physical addresses (i.e., PA0 and PA1, respectively) or at least a portion thereof. If its L1 cache 115 contains any portion of the assigned physical addresses, then the processor flushes the content of those addresses into the system memory 130 at step 504. Moreover, the SCU 119 of the host cluster determines whether any portion of PA0 (similarly for PA1) is cached by a processor 112 in the host cluster that is not the assigned processor for that address range. The SCU 119 checks the SCU tags, and requests these processors to flush the portion of PA0 and PA1 from their L1 caches 115 at step 506. The SCU tags may indicate that a requested physical address is owned or shared by a processor in the host cluster that is not the assigned processor for that address range. In one embodiment, the SCU 119 of the host cluster may request the SCU(s) of the other non-participating cluster(s), if any, to check their tags and to have the other clusters' processors flush a portion of their caches (including L1 and L2 caches) if they own any portion of the physical addresses.

At steps 505 and 506 in the above example, the SCU 119 of the host cluster may process the requests from all of the processors in the same host cluster in parallel. Thus, in the above example, the SCU 119 of the host cluster may process, in parallel, a request from P0 and a request from P1 to check SCU tags for their assigned address ranges, PA0 and PA1, respectively. In an embodiment where the participating processors in parallel flushing are located in more than one cluster, the SCUs 119 of these participating clusters may perform the steps 505 and 506 in parallel.

Figure 6:
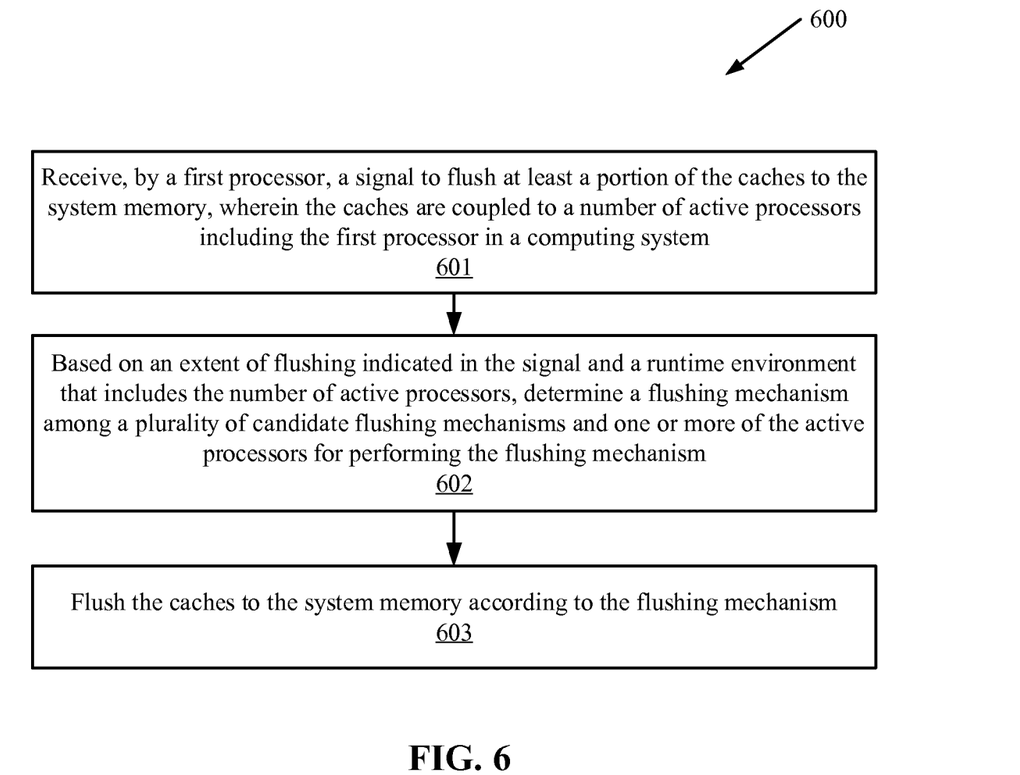
FIG. 6 is a flow diagram illustrating a method for cache flushing according to one embodiment.

FIG. 6 is a flow diagram illustrating a method 600 for cache flushing in a computing system (e.g., the computing system 100 of FIG. 1) according to one embodiment. The computing system includes multiple processors including a first processor (which can be any active processor 112 in any cluster 110 of FIG. 1). The method 600 begins at step 601 when the first processor receives a signal (e.g., a request, a command, etc.) to flush at least a portion of the caches to the system memory. The caches are coupled to a number of active processors including the first processor in the computing system. At step 602, based on an extent of flushing indicated in the signal and a runtime environment, the first processor determines a flushing mechanism among a number of candidate flushing mechanisms, and also determines one or more of the active processors for performing the flushing mechanism. In one embodiment, the runtime environment includes the number of active processors in the system. Additional factors such as system workload of each processor, availability of each processor, and requested address range may also be included in the runtime environment.

After a flushing mechanism is determined, at step 603, the system flushes the caches to the system memory according to the chosen flushing mechanism. The processor or processors participating in the cache flushing depend on the chosen flushing mechanism.

The operations of the flow diagrams of FIGS. 3-6 have been described with reference to the exemplary embodiments of FIGS. 1 and 2. However, it should be understood that the operations of the flow diagrams of FIGS. 3-6 can be performed by embodiments of the invention other than those discussed with reference to FIGS. 1 and 2, and the embodiments discussed with reference to FIGS. 1 and 2 can perform operations different than those discussed with reference to the flow diagrams. While the flow diagrams of FIGS. 3-6 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for flushing a plurality of caches to a system memory in a computing system, comprising:
   receiving, by a first processor, a signal to flush at least a portion of the caches to the system memory, wherein the caches are coupled to a number of active processors including the first processor in the computing system;
   based on an extent of flushing indicated in the signal and a runtime environment that includes the number of active processors, determining a flushing mechanism among a plurality of candidate flushing mechanisms and one or more of the active processors for performing the flushing mechanism; and
   flushing the caches to the system memory according to the flushing mechanism.

2. The method of claim 1, wherein the candidate flushing mechanisms include at least: complete flushing of all contents in the caches, address-range-specific flushing by one of the active processors, and address-range-specific parallel flushing by two or more of the active processors.

3. The method of claim 1, wherein receiving the signal further comprises:
   receiving the signal that includes no address range, which indicates that all contents in the caches are to be flushed; and
   requesting, by the first processor, that all of the active processors to flush the caches completely.

4. The method of claim 1, wherein receiving the signal further comprises:
   receiving the signal that includes a range of virtual addresses to be flushed; and
   based on the range of virtual addresses and the number of active processors, determining the flushing mechanism and the one or more of the active processors for performing the flushing mechanism.

5. The method of claim 1, further comprising:
   receiving the signal that includes a range of virtual addresses to be flushed; and in response to a determination that the range of virtual addresses divided by the number of active processors is greater than a first predetermined threshold, requesting, by the first processor, that all of the active processors to flush the caches completely.

6. The method of claim 5, further comprising:
in response to a determination that the range of virtual addresses divided by the number of active processors is greater than a second predetermined threshold and not greater than the first predetermined threshold, assigning a different subset of the range to each of the active processors to flush.

7. The method of claim 6, further comprising:
in response to a determination that the range of virtual addresses divided by the number of active processors is greater than the second predetermined threshold, flushing the range of virtual addresses by the first processor.

8. The method of claim 1, wherein the caches include at least level-1 (L1) and level-2 (L2) caches.

9. The method of claim 1, further comprising:
disabling hot-plug and preemption of the active processors before flushing the caches; and
enabling the hot-plug and preemption of the active processors after the flushing is completed.

10. The method of claim 1, wherein the signal indicates a range of virtual addresses for flushing, the method further comprising:
translating the virtual addresses into physical addresses;
identifying one or more other active processors in the computing system that cache at least a portion of the physical addresses by checking tags stored in a snoop control unit; and
requesting the one or more other active processors to flush their caches, respectively.

11. A system comprising:
a plurality of processors that include a number of active processors;
a plurality of caches coupled to the active processors; and
a system memory coupled to the plurality of caches,
wherein each processor of the active processors is operative to:
receive a signal to flush at least a portion of the caches to the system memory;
based on an extent of flushing indicated in the signal and a runtime environment that includes the number of active processors, determine a flushing mechanism among a plurality of candidate flushing mechanisms and one or more of the active processors for performing the flushing mechanism; and
direct the one or more of the active processors to flush the caches to the system memory according to the flushing mechanism.

12. The system of claim 11, wherein the candidate flushing mechanisms include at least: complete flushing of all contents in the caches, address-range-specific flushing by one of the active processors, and address-range-specific parallel flushing by two or more of the active processors.

13. The system of claim 11, wherein the each processor is further operative to:
receive the signal that includes no address range, which indicates that all contents in the caches are to be flushed; and
request that all of the active processors to flush the caches completely.

14. The system of claim 11, wherein the each processor is further operative to:
receive the signal that includes a range of virtual addresses to be flushed; and
based on the range of virtual addresses and the number of active processors, determine the flushing mechanism and the one or more of the active processors for performing the flushing mechanism.

15. The system of claim 11, wherein the each processor is further operative to:
receive the signal that includes a range of virtual addresses to be flushed; and
in response to a determination that the range of virtual addresses divided by the number of active processors is greater than a first predetermined threshold, request all of the active processors to flush the caches completely.

16. The system of claim 15, wherein the each processor is further operative to:
in response to a determination that the range of virtual addresses divided by the number of active processors is greater than a second predetermined threshold and not greater than the first predetermined threshold, assign a different subset of the range to each of the active processors to flush.

17. The system of claim 16, wherein the each processor is further operative to:
in response to a determination that the range of virtual addresses divided by the number of active processors is greater than the second predetermined threshold, flush the range of virtual addresses by the processor.

18. The system of claim 11, wherein the caches include at least level-1 (L1) and level-2 (L2) caches.

19. The system of claim 11, wherein the each processor is further operative to:
disable hot-plug and preemption of the active processors before flushing the caches; and
enable the hot-plug and preemption of the active processors after the flushing is completed.

20. The system of claim 11, wherein the signal indicates a range of virtual addresses for flushing, the each processor further operative to:
translate the virtual addresses into physical addresses;
identify one or more other active processors in the system that cache at least a portion of the physical addresses by checking tags stored in a snoop control unit; and
request the one or more other active processors to flush their caches, respectively.

* * * * *